(12) United States Patent
Lee et al.

(10) Patent No.: US 8,563,153 B2
(45) Date of Patent: Oct. 22, 2013

(54) BATTERY MODULE HAVING IMPROVED END PLATE

(75) Inventors: Hyun-Ye Lee, Yongin-si (KR);
Tae-Yong Kim, Yongin-si (KR);
Myung-Chul Kim, Yongin-si (KR);
Shi-Dong Park, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 439 days.

(21) Appl. No.: 12/801,968

(22) Filed: Jul. 6, 2010

(65) Prior Publication Data
US 2011/0117409 A1 May 19, 2011

(30) Foreign Application Priority Data
Nov. 16, 2009 (KR) .................. 10-2009-00110366

(51) Int. Cl.
*H01M 2/10* (2006.01)
*H01M 2/02* (2006.01)
*H01M 2/00* (2006.01)

(52) U.S. Cl.
USPC ............... 429/99; 429/96; 429/100; 429/149; 429/156; 429/159; 429/163; 429/176

(58) Field of Classification Search
None
See application file for complete search history.

(56) References Cited

U.S. PATENT DOCUMENTS

| 2001/0019255 A1 | 9/2001 | Park |
| 2007/0026305 A1* | 2/2007 | Jeon et al. ............ 429/159 |
| 2011/0151314 A1* | 6/2011 | Ogawa ............ 429/158 |

FOREIGN PATENT DOCUMENTS

| EP | 1575103 A2 | 9/2005 |
| EP | 1990861 A1 | 11/2008 |
| JP | 2008-181765 A | 8/2008 |
| KR | 1020060086119 | * 1/2007 |
| KR | 10 2007-0014630 A | 2/2007 |
| KR | 10 2007-0025734 A | 3/2007 |
| WO | WO 2008/106641 A1 | 9/2008 |

OTHER PUBLICATIONS

Korean Office Action in KR 10-2009-0110366, dated Mar. 23, 2011 (Lee, et al.).
European Extended Search Report in EP 10189414.5-2119, dated Dec. 12, 2010 (Lee, et al.).

* cited by examiner

*Primary Examiner* — Barbara Gilliam
*Assistant Examiner* — Angela Martin
(74) *Attorney, Agent, or Firm* — Lee & Morse, P.C.

(57) ABSTRACT

A battery module including a row of batteries; and end plates coupled to ends of the row of batteries, wherein the end plates include a reinforcing portion for increasing strength of the end plates.

19 Claims, 4 Drawing Sheets

BATTERY MODULE HAVING IMPROVED END PLATE

BACKGROUND

1. Field

Embodiments relate to a battery module having an improved end plate.

2. Description of the Related Art

A battery module, which may be fabricated by connecting a plurality of batteries, may be an element of a large capacity power supply unit. For example, the battery module may be used as a power source in electric cars.

Battery modules may generally include lithium ion batteries. Performance of the lithium ion battery may rarely degrade, even after repeated charging/discharging operations. However, a negative electrode of the lithium ion battery may expand due to, e.g., movement of lithium ions when the lithium ion battery is charged. Since battery modules may include a plurality of lithium ion batteries, they may expand about 5 to about 10% larger than their original size. Thus, the battery module may be deformed, and accordingly, it may be difficult to attach/detach the battery module to/from a desired location. In addition, electrical resistance of the lithium ion battery may increase. Moreover, when the battery module is used in an electric car, a battery pack including about eight battery modules may be mounted in the electric car, and thus, deformation may become severe.

SUMMARY

Embodiments are directed to a battery module having an improved end plate, which represents advances the related art.

It is a feature of an embodiment to provide a battery module that may prevent undesirable expansion of batteries.

At least one of the above and other features and advantages may be realized by providing a battery module including a row of batteries; and end plates coupled to ends of the row of batteries, wherein the end plates include a reinforcing portion for increasing strength of the end plates.

The reinforcing portion may include at least one supporting bar, the at least one supporting bar being disposed across the end plate.

The supporting bar may be a cylindrical member having a circular cross-section.

The reinforcing portion may include a plurality of supporting bars disposed in parallel with each other.

Each of the end plates may include at least two wings facing each other, the wings being bent from a main body of the end plate and including holes therein, and the at least one supporting bar may be between facing wings and disposed in corresponding holes therein.

The battery module may further include side plates coupled to side surfaces of the row of batteries and the holes in the wings.

The end plate may include a controller for monitoring states of the batteries.

The reinforcing portion may include at least one bead, the bead being formed by bending a part of the end plate so as to protrude from the end plate.

The bead may have a bar shape of square cross-section.

The reinforcing portion may include a plurality of beads arranged in parallel with each other.

Each of the end plates may include at least two wings facing each other, the wings being bent from a main body of the end plate, and the at least one bead may be between facing wings.

The battery module may further include side plates coupled to side surfaces of the row of batteries and holes in the wings.

The reinforcing portion may include at least one supporting bar, the supporting bar being disposed across the end plate, and at least one bead, the bead being formed by bending a part of the end plate so as to protrude from the end plate.

Each supporting bar may be a cylindrical member having a circular cross-section.

The reinforcing portion may include a plurality of the supporting bars arranged in parallel with each other.

Each of the end plates may include at least two wings facing each other, the wings being bent from a main body of the end plate and including holes therein, and the supporting bars may be between facing wings and disposed in corresponding holes therein, and the at least one bead may be between facing wings.

The battery module may further include side plates coupled to side surfaces of the row of batteries and the holes in the wings.

The bead may have a bar shape of square cross-section.

The reinforcing member may include a plurality of beads arranged in parallel with each other and perpendicularly crossing the at least one supporting bar.

At least one of the above and other features and advantages may also be realized by providing a battery pack for powering an electric car including a plurality of the battery modules of an embodiment.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
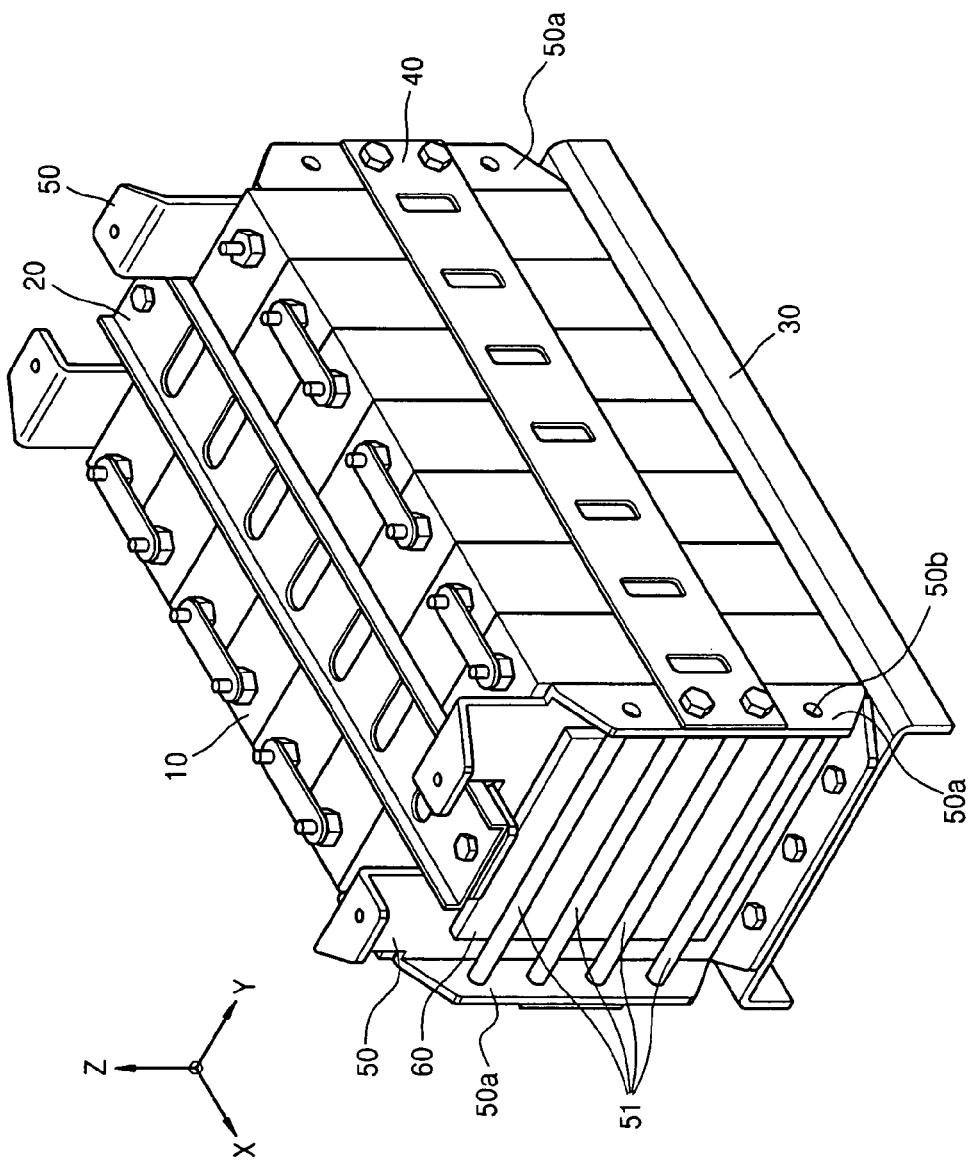
FIG. 1 illustrates a perspective view of a battery module according to an embodiment.

Korean Patent Application No. 10-2009-0110366, filed on Nov. 16, 2010, in the Korean Intellectual Property Office, and entitled: "Battery Module Having Improved End Plate," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
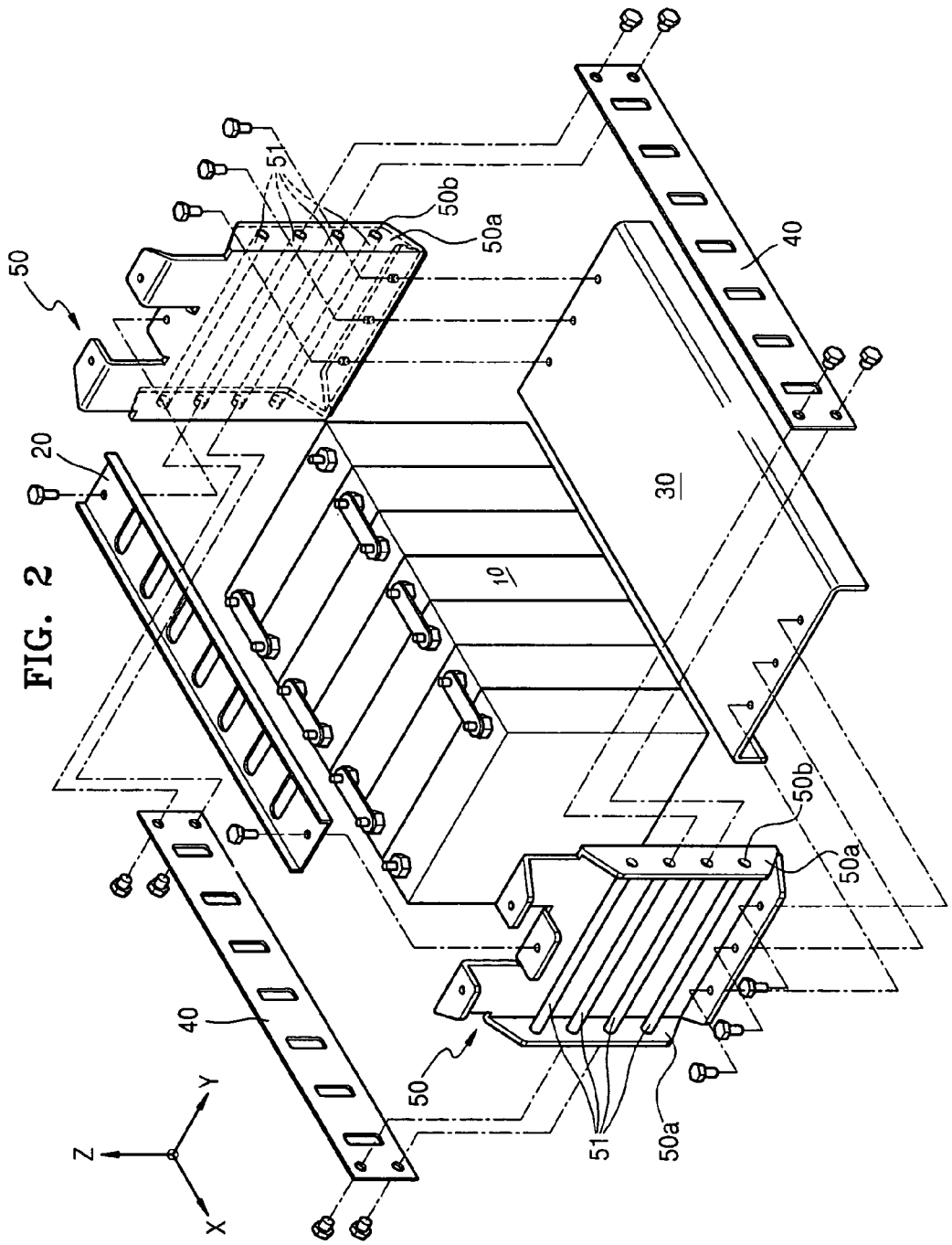
FIG. 2 is illustrates an exploded perspective view of the battery module of FIG. 1.

FIGS. 1 and 2 illustrate perspective views of a battery module according to an embodiment in normal and exploded states. As illustrated in FIGS. 1 and 2, the battery module of the present embodiment may include a row of batteries 10 connected in series and a plurality of plates surrounding the row of the batteries 10. An upper plate 20 and a lower plate 30 may be respectively coupled to upper and lower portions of the row of batteries 10. Side plates 40 may be coupled to both sides of the row of batteries 10.

In addition, end plates 50 may be coupled to end portions of the row of batteries 10. The end plates 50 may prevent the batteries 10 from moving in a direction in which the batteries 10 are connected (X-axis direction).

When the batteries 10 expand during charging operations, the expansion of the batteries 10 may not largely affect the battery module in a Y-axis direction or in a Z-axis direction. However, the expansion of the batteries 10 in the X-axis direction may greatly affect the battery module due to a combined expansion of the batteries 10. Therefore, the battery module may be deformed in the X-axis direction, and accordingly, a great amount of pressure may be applied to the end plates 50. If the end plates 50 are deformed due to the pressure applied thereto, it may be difficult to mount/detach the battery module on/from a desired location. Further, electrical resistance in the batteries 10 may increase due to the expansion. Thus, a lifespan of the battery module may be reduced.

Therefore, in the battery module of the present embodiment, a plurality of supporting bars 51, each having a circular cross-section, may be disposed on each of the end plates 50 as reinforcing portions. The plurality of supporting bars 51 may be disposed in parallel to each other across the end plate 50 in order to improve a strength of the end plate 50. That is, the plate-shaped end plate 50 alone may not prevent deformation caused by the expansion of the batteries 10. However, when the plurality of supporting bars 51, which may cross the end plate 50, reinforce the strength of the end plate 50, the deformation of the battery module may be efficiently prevented, even with the expansion of the batteries 10. The end plate 50 may include wing portions 50a formed by bending sides of the end plate 50. The wing portions 50a may be disposed on opposite ends of the end plate 50. Ends of the supporting bars 51 may be inserted into holes 50b in corresponding wing portions 50a and coupled thereto. The side plates 40 may also be coupled to the holes 50b with bolts.

Therefore, deformation of the battery module caused by expansion of the batteries 10 may be prevented. Thus, the battery module may be fabricated in a manner that maintains stability. In addition, a battery pack that is used as a power source in electric cars may be fabricated by connecting a plurality of battery modules. Thus, since the battery modules forming the battery pack may be stable, the battery pack may also have a stable structure. In addition, although deformation in the row direction (X-axis direction) caused by expansion of the batteries 10 is mainly described in the present embodiment, the strength of the battery module in other directions may also increase. In other words, the upper plate 20, lower plate 30, and side plates 40 may provide support to the battery module in all directions. Accordingly, strength may be increased against external pressure applied to the battery module, as well as against internal pressure caused by the expansion of batteries.

A battery management system 60, i.e., a BMS or a controller, may monitor voltage and current states of each of the batteries 10. The controller 60 may be disposed in a space between the supporting bars 51 and the end plate 50.

Figure 3:
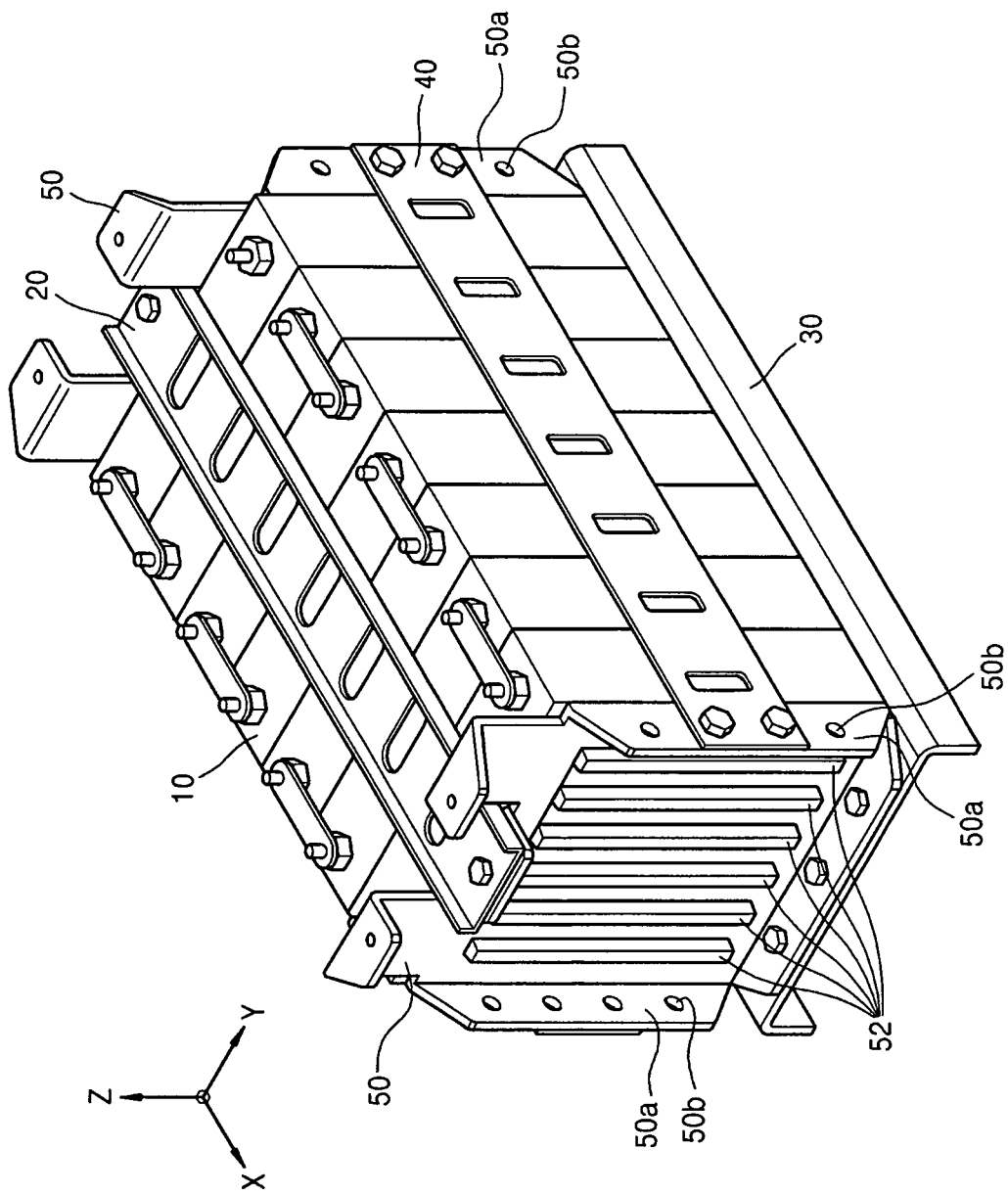
FIG. 3 is illustrates a perspective view of a battery module according to another embodiment.

FIG. 3 illustrates a perspective view of battery module according to another embodiment. Like reference numerals as those of the previous embodiment denote like elements. The battery module of the present embodiment may include the row of batteries 10, the upper plate 20, the lower plate 30, the side plates 40, and the end plates 50 surrounding the row of batteries 10.

In the present embodiment, the end plates 50 may include beads 52 formed as a reinforcing portion for increasing the strength of each of the end plates 50. The beads 52 may be formed by bending portions of the end plate 50. Bending the plate shaped end plate 50 to form the beads 52 may increase the strength thereof. That is, the end plate 50 itself may be bent to form a plurality of, e.g., rectangularly shaped bars with square cross-sections, protruding in parallel with each other, without including an additional member, e.g., the supporting bars 51 (refer to FIG. 1). Thus, the strength of the end plate 50 against the expansion of the batteries 10 may be increased. Accordingly, the strength of the end plate 50 may be increased without increasing the number of components; and deformation of the battery module caused by expansion of the batteries 10 may be prevented.

However, in the present embodiment, it may be difficult to install the controller 60 (refer to FIG. 1) on the surface of the end plate 50 due to the beads 52 protruding between the wings 50a of the end plate 50. In this case, the controller 60 may be installed in another portion of the battery module.

Figure 4:
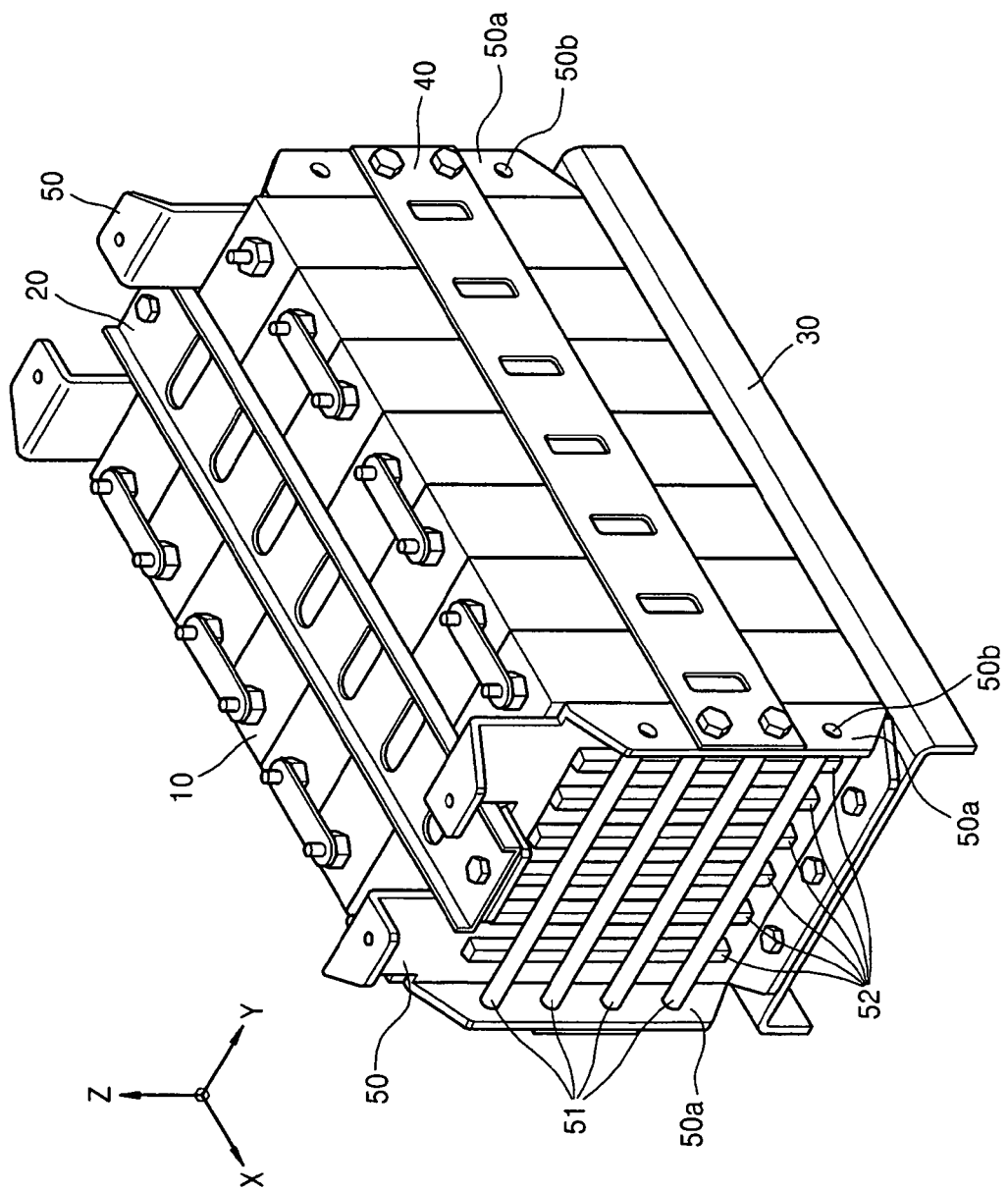
FIG. 4 is illustrates a perspective view of a battery module according to yet another embodiment.

FIG. 4 illustrates a perspective view of a battery module according to yet another embodiment. Like reference numerals as those of the previous embodiments denote like elements. The battery module of the present embodiment may include the row of batteries 10, the upper plate 20, the lower plate 30, the side plates 40, and the end plates 50 surrounding the row of batteries 10.

In the present embodiment, the battery module may include the beads 52 having a rectangular bar shape, i.e., rectangularly shaped, elongated sides with square cross-sections, and the supporting bars 51 having a cylindrical shape in order to reinforce the end plates 50. That is, the plurality of supporting bars 51 may be formed in parallel with each other across the end plate 50 and the plurality of beads 52 may be formed by bending portions of the end plate 50. Here, the supporting bars 51 and the beads 52 may be disposed so as to perpendicularly cross each other. Thus, the strength in the direction of connecting the batteries 10 (X-axis direction) may be maximized. Accordingly, deformation of the battery module caused by expansion of the batteries 10 may be prevented.

In the present embodiment, the controller 60 (refer to FIG. 1) may be installed in another portion of the battery module due to the protruding beads 52.

In the battery module having the above described structures, beads and/or supporting bars may be installed on the end plates in order to prevent deformation of the end plates. Such deformation may be caused by expansion of the batteries, and accordingly, a battery module having a stable structure may be realized.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery module, comprising:
a row of batteries; and
an end plate coupled to one end of the row of batteries, the end plate having a first wing and a second wing that face each other and that are bent portions extending from a main body of the end plate, the first wing including first holes therein and the second wing including second holes therein, the first holes facing the second holes,
the end plate having a reinforcing portion for increasing strength of the end plate, the reinforcing portion including a plurality of supporting bars between the first and second wings, and the supporting bars being coupled to the first and second holes.

2. The battery module of claim 1, wherein the plurality of supporting bars are arranged to cross the end plate.

3. The battery module of claim 2, wherein each of the supporting bars is a cylindrical member having a circular cross-section.

4. The battery module of claim 2, wherein the plurality of supporting bars are disposed in parallel with each other.

5. The battery module of claim 1, further comprising side plates coupled to side surfaces of the row of batteries, the side plates being coupled to ones of the first holes and ones of the second holes having ones of the supporting bars coupled thereto.

6. The battery module of claim 2, wherein the end plate includes a controller for monitoring states of the batteries.

7. The battery module of claim 1, wherein the reinforcing portion includes at least one bead, the bead being formed by bending a part of the end plate so as to protrude from the end plate.

8. The battery module of claim 7, wherein the bead has a bar shape of square cross-section.

9. The battery module of claim 7, wherein the reinforcing portion includes a plurality of beads arranged in parallel with each other.

10. The battery module of claim 7, further comprising another end plate coupled to another end of the row of batteries, wherein:
the other end plate includes another first wing and another second wing that face each other, the other first and second wings being bent from a main body of the other end plate,
the other end plate has another reinforcing portion for increasing strength of the other end plate, the other reinforcing portion including a plurality of other supporting bars between the other first and second wings, and the other supporting bars being coupled to the other first and second holes, and
the other end plate includes at least one other bead, the at least one other bead being between the other first and second wings.

11. The battery module of claim 10, further comprising side plates coupled to side surfaces of the row of batteries, the side plates being coupled to both the first and second wings of the end plate and the other first and second wings of the other end plate.

12. The battery module of claim 7, wherein each of the supporting bars is a cylindrical member having a circular cross-section.

13. The battery module of claim 7, wherein the plurality of the supporting bars are arranged in parallel with each other.

14. The battery module of claim 7, wherein the at least one bead is between the first and second wings that face each other.

15. The battery module of claim 9, wherein the plurality of beads are arranged in parallel with each other along a first direction and the plurality of supporting bars are arranged in parallel with each other along a second direction, the first direction perpendicularly crossing the second direction.

16. A battery pack for powering an electric car, comprising a plurality of the battery modules as claimed in claim 1.

17. The battery module of claim 1, wherein:
each of the plurality of supporting bars has a first end seated within one of the first holes and a second end seated within one of the second holes, and
each of the plurality of supporting bars extends across the main body of the end plate.

18. The battery module of claim 17, wherein each of the plurality of supporting bars are spaced apart from each other such that each of the supporting bars are seated in different ones of the first holes and different ones of the second holes.

19. The battery module of claim 1, wherein:
reinforcing portion includes a plurality of beads arranged in parallel with each other and bent from a part of the end plate so as to protrude from the end plate, and
the plurality of beads protrude from the end plate in a direction toward the plurality of supporting bars such that the beads face the supporting bars and are between the first and second wings.

* * * * *